United States Patent [19]
Gubler et al.

[11] Patent Number: 5,985,350
[45] Date of Patent: Nov. 16, 1999

[54] POURABLE FAT COMPOSITIONS CONTAINING A THICKENER

[75] Inventors: Gregor Gubler; Joanna Mary Shaw MacMillan, both of Zug, Switzerland; Cornelis Willem van Oosten, Vlaardingen, Netherlands

[73] Assignee: Lipton, Englewood Cliffs, N.J.

[21] Appl. No.: 09/061,376

[22] Filed: Apr. 16, 1998

[30] Foreign Application Priority Data

Apr. 24, 1997 [EP] European Pat. Off. ............ 97201188

[51] Int. Cl.$^6$ ............... A23D 9/00; A23L 1/221
[52] U.S. Cl. ............ 426/601; 426/589; 426/573; 426/576; 426/578; 426/638
[58] Field of Search .................. 426/601, 638, 426/573, 578, 576, 589

[56] References Cited

U.S. PATENT DOCUMENTS

| | | | |
|---|---|---|---|
| 3,424,593 | 1/1969 | Bockman | 426/638 |
| 4,385,076 | 5/1983 | Crosby | 426/606 |
| 4,572,836 | 2/1986 | Bakal | 426/613 |
| 4,596,715 | 6/1986 | Ballard | 426/578 |
| 4,971,817 | 11/1990 | Bauman | 426/601 |
| 5,206,046 | 4/1993 | Seeds | 426/589 |
| 5,208,062 | 5/1993 | Sugisawa | 426/589 |
| 5,215,769 | 6/1993 | Fox | 426/605 |
| 5,498,439 | 3/1996 | Bonner | 426/573 |
| 5,508,055 | 4/1996 | Rubow | 426/573 |
| 5,538,751 | 7/1996 | Carter | 426/573 |
| 5,654,029 | 8/1997 | Heeringa | 426/601 |
| 5,690,990 | 11/1997 | Bonner | 426/573 |
| 5,773,072 | 6/1998 | Campbell | 426/589 |

FOREIGN PATENT DOCUMENTS

| | | |
|---|---|---|
| 1144815 | 4/1983 | Canada . |
| 2188633 | 4/1997 | Canada . |
| 021 483 | 2/1984 | European Pat. Off. . |
| 486 936 | 5/1992 | European Pat. Off. . |
| 536 976 | 4/1993 | European Pat. Off. . |
| 653 166 | 5/1995 | European Pat. Off. . |
| 775444 | 5/1997 | European Pat. Off. . |
| 2594006 | 8/1987 | France ................. 426/438 |
| 51-7158 | 1/1976 | Japan .................. 426/638 |
| 2003264 | 11/1993 | Russian Federation ...... 426/638 |
| 92/07475 | 5/1992 | WIPO . |
| 9408470 | 4/1994 | WIPO . |
| 95/28849 | 11/1995 | WIPO . |
| 96/02151 | 2/1996 | WIPO . |
| 96/29894 | 10/1996 | WIPO . |

OTHER PUBLICATIONS

"The Book of Spices", Livingstone Publ. Comp. 1969, p. 3.
PCT Search report dated Aug. 21, 1998 in the application of PCT/EP98/02269.

*Primary Examiner*—Carolyn Paden
*Attorney, Agent, or Firm*—James J. Farrell

[57] ABSTRACT

Pourable fat compositions, provided with thickeners having a good closed-shelf life are obtained, if the compositions have the following composition:

- 0–45 wt % herbs, spices, nuts or seeds
- 5–60 wt % of thickener
- 0–5 wt % of emulsifier
- 0–10 wt % of milk proteins
- 0–10 wt % of egg yolk powder
- 1–10 wt % salt
- 50–89 wt % of fat blend, comprising
  - (i) 90–99.8 wt % liquid oil
  - (ii) 10–0.2 wt % hard fat, that can form crystal network
- 0–20 wt % of flavour-compositions

10 Claims, No Drawings

POURABLE FAT COMPOSITIONS CONTAINING A THICKENER

Fat-compositions that contain herbs and/or spices are known in the prior art (c.q. U.S. Pat. No. 4,572,836). However so far these compositions are only known as pastes, or other non-pourable herbs-dispersions, wherein the fats applied in the paste have high trans-contents; these products contain high levels (>12%) of cooking salt and other inorganic or organic salts for microbiological keepability and taste boosting effect reasons.

Therefore no solution existed for a long felt need, i.e. a fat product, that could be handled easily, e.g. by being in a pourable form, which contained high concentrations of herbs, spices, nuts, cheese and/or seeds and low concentrations of the unhealthy trans-fats, while its closed shelf life was at least 6 months.

BACKGROUND OF THE INVENTION

In EP 21 483 it is disclosed that flavor enhancing materials in the form of ionic salts, such as sodium chloride can be incorporated in liquefiable fats if they are first micronised to a particle size of 1–10 microns. In that instance compositions can be obtained, which are stable for more than 2 hours. Incorporation of a hardstock fat can increase the stability to about 6 months. Examples of hardstock fats mentioned are fully hydrogenated normally solid fatty triglycerides with an IV <15. These hardstocks can contain fatty acid residues with 12–22 C-atoms. Examples of hardened oils are given on p.8, 1.3–8, however this listing does not include hardened rape seed oils. Although the disclosure of this document is very generic in the definition of the flavor enhancing component, it is also clear from this document that the only flavor enhancing components, that were actually considered, are ionic salts. Therefore this document does not provide directions how to come to pourable fat compositions with very high contents of herbs and/or spices, that would be stable for long periods of time (=having long closed shelf life).

From WO 94/08470 salad dressings are known, wherein the fat phase can contain a hardened rapeseed oil component. The dressing further can contain up to 4 wt % of a herb or spices. As this reference relates to water-containing dressings, this document does not provide a solution for system wherein no waterphase is present and that contain high amounts of herbs and/or spices.

In our co-pending European patent application 96202913.8 we disclosed a fat-composition that fulfils all above requirements. So accordingly above EP patent application concerns a pourable fat-composition, that is ambient-stable, and wherein the fat-composition comprises:

- 10–45 wt % of herbs, spices, nuts and/or seeds
- 0–20 wt % of cheese particles
- 1–10 wt % of an edible salt
- 50–89 wt % of a fat blend, comprising:
  - (i) 90–99.8 wt % of liquid oil
  - (ii) 10–0.2 wt % of a hard fat component, that has the ability to form a crystal network in the endproduct, preferably being hardened high erucic rapeseed oil, while the total-composition is flavoured by the presence of 0.5–5 wt % on total composition of flavour-ingredients.

Above compositions are substantially free of trans fatty acids. In fact the amounts of trans acids are less than 5 wt %, preferably less than 0.5 wt %. (Calculated on total fatty acid content.)

Although above compositions can be applied successfully in many application these compositions are unsuitable for application in products like Ready-to-use Roux; Ready-to-use brown or white sauces or Ready-to-use Sauce Hollandaise, optionally obtainable by adding an aqueous liquid and applying heat. In order to make them suitable for those applications it was found that a thickener should be incorporated in the compositions according to EP 96202913, while the amount of spices, herbs, nut and/or seeds could be lowered or could even be absent.

BRIEF SUMMARY OF THE INVENTION

The novel products according to the invention therefore comprise pourable fat compositions, that are ambient-stable, wherein the fat-composition comprises:

- 0–45 wt % of herbs, spices, nuts and/or seeds
- 5–60 wt % of a thickener, in particular selected from natural or modified starches, natural or modified gum
- 0–10 wt % of milk proteins
- 0–10 wt % of egg yolk powder
- 0–5 wt % of emulsifier
- 0–35 wt % of meat-extract or gravy flavour
- 1–10 wt % of an edible salt
- 30–89 wt % of a fat blend, comprising:
  - (i) 90–99.8 wt % of liquid oil
  - (ii) 10–0.2 wt % of a hard fat component, that has the ability to form a crystal network in the endproduct, preferably being hardened high erucic rapeseed oil, while the total-composition is flavoured by the presence of 0–20 wt % on total composition of flavour-ingredients. The thickener is suitably selected from natural or modified starches, such as natural wheat flour, modified starch e.g. Col Flo 67® (from National Starch), natural or modified gums, such as carrageenan gum, guar gum, xanthan gum, locust bean gum etc. Gelatin from any source can also be used as thickener.

The milk-proteins can be added as skimmed milk powder, but also as full milk powder. The amount used preferably ranges from 1–8 wt %, in particular from 2–6 wt %.

The egg-yolk powder can be dried natural egg-yolk, but can also be an enzymically modified egg-yolk powder, such as (spray) dried egg-yolk powder stabilised using an enzyme having phospholipase A2 activity.

The meat-extract or the gravy flavour is typically present in the brown sauces. Typical amounts being 2–28 wt %.

The composition can be stabilised by addition of low amounts of preservatives, such as 0.05–2 wt % of sorbic acid or salts hereof.

The products as disclosed above can be mixed up with hot water, hot milk, stock, or other hot aqueous liquid, i.e. having a temperature of >80° C., preferably 85–99° C., in particular 90–95° C., without having lumping or caking problems. The amount of water, milk, or aqueous liquid that can be used depends on the thickness and taste requirements of the user, but in fact no limitations exist hereon. Typical dillution rates are 1 part of the composition as described above and 3 to 8 part, preferably 4–6 parts of aqueous liquid. After the mixing of the ingredients the composition should be kept at the high temperature for some minutes for cooking purposes and to ensure thickness.

Alternatively, the composition as disclosed above may be added to a cold aqueous liquid (e.g. water, wine, milk, stock, etc.), whereafter heat should be applied sufficiently to achieve a thickening effect.

Herbs are defined in The Illustrated Herbal Handbook by J. de Baïracli Levy, Faber and Faber Ltd., Londen, chapter 3. Spices are defined in "The Book of Spices", Livingstone Publ. Comp. 1969, p. 3.

The amount of herbs and/or spices preferably is 10–45 wt %, more preferably 20–30 wt %. The amount of nuts and/or seeds is preferably 10–20 wt %, more preferably 12–15 wt %.

The herbs and spices may be used as frozen herbs or spices, containing 10–95 wt % of water. Preferred herbs are selected from the group, consisting of sage, rosemary, basil, thymian, oregano, dill, parsley, garlic, onion, savory, majoram, dragon, red/green/yellow pepper and mixtures thereof known as Provencal and Italian, while the spices are selected from the group, consisting of black and white pepper, nut meg, mace, curry, curcuma, saffron, clove and mixtures thereof.

The edible salt can be derived from inorganic or organic acids or bases. The most preferred edible salt is NaCl. The preferred amount is 2–7 wt %.

The fat phase can contain small amounts of surfactants (up to 2 wt %). Suitable surfactants are e.g. mono/ diglycerides-mixtures, but in general any known surfactant can be applied. The fat blend is present in our compositions in an amount of 40–89 wt %, preferably 60–85 wt %, more preferably 70–80 wt %.

The liquid oil, which is applied in amounts of 90–99.8 wt % in these fat blends can be selected from the group, consisting of: sunflower oil, high oleic sunflower oil, rape-seed oil, safflower oil, high oleic safflower oil, soyabean oil, coconut oil, maize oil, cotton seed oil, arachidic oil, olein-fractions of natural oils, such as palm oil olein, MCT-oils. The oil displays a solid fat content (NMR-pulse, not-stab.) of less than 10% at 20° C. Preferably the amount of liquid oil is 93–99, most preferably 95–98 wt % in the fat blend.

The hard fat component of these blends must have the ability to form a crystal network in our compositions. This requirement is essential if stable compositions, wherein the herbs and/or spices are to remain dispersed during the shelf life of the compositions, are aimed for. Examples of suitable fats are hardened rapeseed oil, hardened sunflower seed oil, hardened soybean oil, hardened palm oil, hardened cotton-seed oil or mixtures thereof. The best results were obtained, by using hard fats, having an I.V. <10, preferably containing >40 wt % of $C_{20+}$—saturated fatty acids. A most preferred hard fat is fully hardened, high erucic rapeseed oil (Rp-70).

The pourable character of our compositions is guaranteed when the fat blend of liquid oil and 1–5 wt % hard fat-component has an apparent viscosity at 5° C. of 100–500 m.Pa.s. after storage for 5 days at 5° C., at a shear of 200 s–1. The apparent viscosity at 20° C. being suitably between 50 and 300 m.Pa.s. The apparent viscosity is measured with a Physica UM-MC-100 viscometer on a sample of about 20 ml of liquid oil, containing 1–5 wt % of the hard fat-component. The blend is first stored for 5 days at measurement temperature, whereupon it is subjected to a shear of 200 $s^{-1}$. The viscosity is measured after 2 min. shearing.

The flavour-component can be selected from etherical oils, natural or nature-identical flavour components or even artificial flavour compositions. Our compositions can be made by known techniques. Suitable procedures involve the preparation of a premix of liquid oil and hard fat, using two A-units. After mixing of the oil and hard fat at 70–85° C. the mix can be transferred through an A1-unit, using an exit temperature of 0–10° C. and subsequently through an A2-unit, using a lower exit temperature of -8 to 5° C. The ingredients can be added in one batch to the oil or can be added in different batches to the fat mix during different phases of the process.

However we prefer to apply a process, wherein a cooling step is applied on the mixture of ingredients in the oil, prior to the addition of the hard fat component. In this way a better crystal network of the hard fat component can be established as a result of the addition of the hard fat component at a lower temperature. The thickener is usually mixed with part of the liquid oil which is optionally preheated. Therefore our invention also concerns a process for the preparation of our pourable fat-compositions, according to which process, (i) thickener is mixed with part of the liquid oil, which optionally is preheated (ii) the mix, resulting of (i) is optionally heated at 70–85° C. for 2–10 min.

(iii) the mix, resulting from (i) or the heated mix, resulting from (ii) is cooled to a temperature of maximum 25° C.

(iv) the rest of the liquid oil is mixed with the hard-fat component at a temperature below 30° C.

(v) the products from (iii) and (iv) are mixed under the addition of the remaining components resulting in the product.

It was found, that the best ambient-stability was obtained, if in step (ii) the mix obtained in step (i) is heated to 70–85° C. for 2–10 min, preferably 4–8 min.

The mixing according to step (iv) can be performed by any conventional mixing technique. However it was found that the best dispersions were obtained if this mixing was performed in a votator (=scraped surface heat-exchanger).

EXAMPLES 1. 280 g. of sunflower oil was heated to 80° C. 100 g. of deepfrozen (–20° C.) basil were added to this mix. The temperature was maintained at 75° C. for 5 min. by heating. The mixture obtained is cooled, while stirred, to 12° C. in about 10 min.

A mixture of 120 g. fat (composition: 92% sunflower oil and 8% hardened rapeseed oil m.pt. 70° C.) and 8 g. of Basil etheric oil (ex Tastemaker, art. no. KT 0117) as flavour ingredients and 24 g. NaCl were added to the mixture at 12° C. An additional stirring during 10 min. was performed.

The product was collected.

2. The procedure of example 1 was repeated, however applying hardened sunflower oil m.pt. 69° C. in stead of hardened rapeseed oil m.pt. 70° C. The amount of hardened sunflower oil was 4 wt % on total oil.

Above fat was applied for the preparation of compositions containing 44 wt % Dille or 44 wt % of a Provencal mix(=a mix of Marjoram herbs, Thyme herbs, Basil herbs, Rosemary herbs and Garlic paste in wt-ratio: 12.5: 2.5: 3.5: 2.5: 4.0).

The products obtained had acceptable properties, but were somewhat viscous and wither.

3. The procedure of example 2 was repeated, however using hardened rapeseed oil m.pt.70° C. in stead of hardened sunflower oil in an amount of 3 wt % on total oil.

The products obtained were not viscous and were not wither, so the products performed better than the products of example 2.

4. The procedure of example 3 was repeated, however applying a fat consisting of 25 wt % olive oil and 75 wt % sunflower oil.

The hardened rapeseed was used in an amount of 2.5 wt %. Dille was applied as herb.

The product obtained displayed excellent properties.

5. Preparation of a liquid brown base sauce.

The following dry ingredients were mixed with the fat base and the liquid oil in the amounts indicated.

| Ingredient | wt % |
| --- | --- |
| onion flavour | 0.12 |
| thickener-mixture | 0.44 |
| caramel powder | 0.80 |
| meat extract dried | 1.16 |
| milk protein | 3.77 |
| Col Flo (mod starch from NSC) | 6.28 |
| wheat flour | 9.66 |
| Gravy flavour (dried) | 26.08 |
| sunflower oil | 3.40 |
| pourable composition of example 3 without the herbs | 48.3 |

Mixing of 140 ml of this composition with 1 l of water resulted in the finished sauce.

6. Preparation of a white liquid base sauce.

The following dry ingredients were mixed with fat base and liquid oil.

| Ingredient | amount in wt % |
| --- | --- |
| lactose | 0.64 % |
| chicken flavour | 0.99 |
| Sauce Hollandaise dry flavour | 1.71 |
| skimmed milk powder | 3.30 |
| milk protein | 3.64 |
| instant wheat flour | 3.64 |
| coffee whitener | 4.16 |
| Col Flo (Nat starch) | 6.60 |
| Sauce flavours (dried) | 11.19 |
| sunflower oil | 4.76 |
| fat base from example 5 | 52.38 |

120 ml of this composition were mixed with 1 l full fat milk to provide the finished product.

7. Liquid Hollandaise Base Sauce

The following ingredients were mixed in the amounts indicated.

| Ingredient | amount wt % |
| --- | --- |
| butter flavour | 0.13 |
| citric acid | 0.16 |
| wheat flour | 0.21 |
| thickener mixture | 1.29 |
| sugar | 1.17 |
| full milk powder | 2.64 |
| coffee whitener | 2.76 |
| Dried Hollandaise sauce flavour | 7.43 |
| Col Flo (Nat Starch) | 8.75 |
| egg yolk powder (stabilised) | 4.13 |
| salt | 1.98 |
| fat base of example 5 | 69.57 |

8. Preparation of liquid Roux 500 g of the fat base as made in example 5 were mixed with 500 g of Dalgety flour M 2200 (ie a physically modified wheat flour). The resulting product was used to bind stock to make a Veloute by mixing with the stock and bring back to boil and simmering shortly in dillution with. Dillution rate: 100 g sauce base in 1 liter stock.

9. Preparation of Liquid Binder 450 g of Col Flo (from Nat Starch Comp) were mixed with 550 g of the fat base of example 5.

The resulting mixture was applied for the preparation of sauces after mixing it with hot water and bringing it back to the boil (1 part binder, 10 parts water).

10. Brown Sauce

A mixture was prepared containing 50 wt % of the fat mixture as in Example 3 which was mixed with the following dry ingredients:

| Ingredient | amount wt % |
| --- | --- |
| Dalgety flour M2250 | 23.5 |
| Colflo 67 (National Starch) | 4.4 |
| Lygomme KH6 (gum mixture) | 0.32 |
| salt | 3.1 |
| Flavouring composition | 17.92 |
| Bolec M (lecithine) | 0.76 |
| fat phase according to example 3 | 50.0 |

The resulting mixture was applied for the preparation of sauces after mixing it with hot water (dillution: 1 part concentrate, 6 parts water), bringing back to the boil and simmering for 3 minutes.

11. Curry Sauce

A mixture was prepared containing 54 wt % of the fat mixture as in Example 3 which was mixed with the following dry ingredients:

| Ingredient | amount wt % |
| --- | --- |
| Colflo 67 (National Starch) | 10.0 |
| wheat starch | 15.0 |
| Sugar | 8.8 |
| salt | 3.0 |
| Flavour composition | 9.7 |

The resulting mixture was applied for the preparation of sauces after mixing it with hot water (dillution: 1 part concentrate, 4 parts water), bringing back to the boil and simmering for 3 minutes.

12. White Sauce

A mixture was prepared containing 60 wt % of the fat mixture as in Example 3 which was mixed with the following dry ingredients:

| Ingredient | amount wt % |
| --- | --- |
| wheat starch | 11.0 |
| Colflo 67 | 11.0 |
| creamer | 10.0 |
| salt | 2.3 |
| dried stabilised egg yolk | 1.6 |
| Flavour composition | 2.5 |
| Emultop (lecithin) | 1.6 |

The resulting mixture was applied for the preparation of sauces after mixing it with hot water (dillution: 1 part concentrate, 5 parts water), bringing back to the boil and simmering for 3 minutes.

We claim:

1. Pourable fat-composition, that is ambient-stable, wherein the fat-composition comprises:

0–45 wt % of herbs, spices, nuts and/or seeds

5–60 wt % of a thickener, selected from the group consisting of natural or modified starches, natural or modified gums and gelatins 0–10 wt % of milk proteins 0–10 wt % of egg yolk powder 0–5 wt % of emulsifier 0–35 wt % of meat-extract or gravy flavour 1–10 wt % of an edible salt 30–89 wt % of a fat blend, comprising:
(i) 90–99.8 wt % of liquid oil
(ii) 10–0.2 wt % of a hard fat component, that has the ability to form a crystal network in the endproduct,
while the total-composition is flavoured by the presence 0–20 wt % on total composition of flavour-ingredients.

2. Pourable fat-composition according to claim 1, wherein the herbs and/or spices are frozen fresh herbs and/or spices, containing 10–95 wt % of water.

3. Pourable fat-composition according to claim 1, wherein the herbs are selected from the group, consisting of sage, rosemary, basil, thymian, oregano, dill, parsley, garlic, onion, savory, majoram, dragon, red/green/yellow pepper and mixtures thereof known as Provencal and Italian, while the spices are selected from the group, consisting of black and white pepper, nut meg, mace, curry, curcuma, saffron, clove and mixtures thereof.

4. Pourable fat-composition, according to claim 3, wherein the salt is NaCl.

5. Pourable fat-composition, according to claim 1, wherein the liquid oil is selected from the group, consisting of: sunflower oil, high oleic sunflower oil, safflower oil, high oleic safflower oil, soyabean oil, maize oil, cotton seed oil, arachidic oil, olein-fractions of natural oils, such as palm oil olein, MCT-oils.

6. Pourable fat-composition according to claim 5, wherein the oil displays a solid fat-content (NMR-pulse; not-stab.) of less than 10% at 20° C.

7. Pourable fat-composition according to claim 1, wherein the hard fat has an Iodine value of less than 10 and contains more than 40 wt % of $C_{20+}$—saturated fatty acids.

8. Pourable fat-composition according to claim 1, wherein the fat blend of liq. oil and 1–5 wt % hard fat-component has an apparent viscosity at 5° C. of 100–500 m.Pa.s. after storage for 5 days at 5° C., or at 20° C. of 50–300 m.Pa.s. after storage for 5 days at 20° C., both at a shear of 200 $s^{-1}$.

9. Pourable fat-composition according to claim 1, wherein the flavour-component is selected from etherical oils, natural or nature-identical flavour components.

10. A process for preparing a pourable fat-composition according to claim 1 comprising:
(i) mixing a thickener with part of the liquid oil,
(ii) adjusting the temperature of the mix, to a temperature of maximum 250° C.
(iii) mixing the rest of the liquid oil with the hard-fat component at a temperature below 30° C.
(iv) mixing the products from (ii) and (iii) while adding the remaining components to result in the product according to claim 1.

* * * * *